(No Model.)

H. McHUGH.
MACHINE FOR MOLDING OR EMBOSSING PLASTIC MATERIALS.

No. 459,817. Patented Sept. 22, 1891.

Witnesses
Fred A. Mason
Thos. James

Inventor
Hugh McHugh
by H. W. Mason
atty.

UNITED STATES PATENT OFFICE.

HUGH McHUGH, OF NEW BEDFORD, ASSIGNOR OF ONE-HALF TO GEO. H. BUSH, OF FALL RIVER, MASSACHUSETTS.

MACHINE FOR MOLDING OR EMBOSSING PLASTIC MATERIALS.

SPECIFICATION forming part of Letters Patent No. 459,817, dated September 22, 1891.

Application filed July 26, 1890. Serial No. 360,002. (No model.)

*To all whom it may concern:*

Be it known that I, HUGH McHUGH, a citizen of the United States, residing at New Bedford, in the county of Bristol and State of Massachusetts, have invented certain new and useful Improvements in Machines for Molding or Embossing Plastic Materials, of which the following is a specification.

My improvements relate that class of molding or embossing machines for which Letters Patent No. 318,010, dated May 19, 1885, and No. 324,399, dated August 18, 1885, were granted to myself and Thomas L. Manchester.

My improvements consist, first, in adapting the machine to emboss wide and thin strips of material, such as paper and leather; second, in adapting it to emboss wide and thin strips of material in several different designs and in dividing said designs from each other; third, in adapting the machine to mold plastic material in a series of strips of different design and partially or wholly dividing them from each other, and, fourth, in adapting the machine to molding or embossing plastic material on a strip of wood and in trimming the embossed material to conform to the width of said strip of wood.

Figure 1:
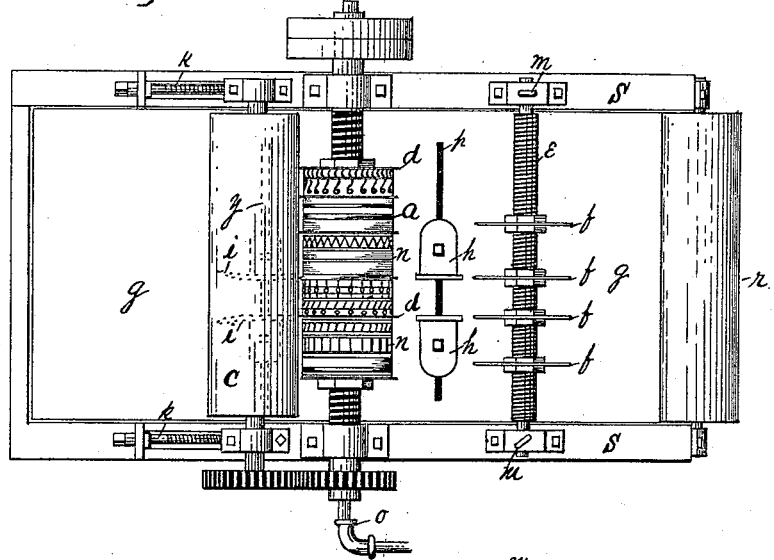
Figure 2:
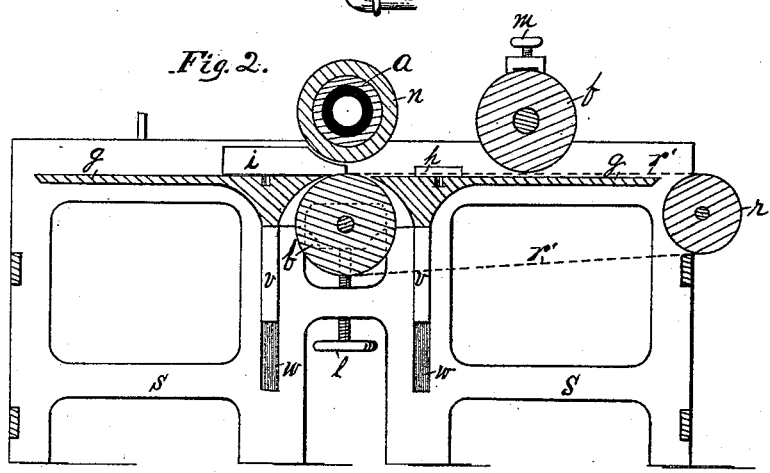

In the accompanying drawings, Figure 1 represents a plan view of my improved embossing-machine, and Fig. 2 represents an upright view of the same in longitudinal vertical section.

Similar letters refer to similar parts throughout the several views.

$s$ represents the frame of the machine.

$g$ represents the bed-plate, having journaled in it the bed-roll $b$, whose periphery projects slightly above the surface of the same.

$v\ v$ are guides on the bed-plate moving in grooves $w\ w$ in the frame of the machine, and the bed-plate and its bed-roll are adjustable up or down by means of the screws $l$, one only of which is shown.

In Fig. 1, $a$ represents the embossing-roll having a hollow shaft and having its embossing-surface composed of cylindrical sections, (made by my process of making rolls for embossing plastic material for which Letters Patent No. 396,589, dated January 22, 1889, were granted to me,) between which (for a purpose hereinafter mentioned) may be interposed the thin disks of metal $d$. The hollow shaft of the embossing-roll $a$ is adapted to be connected with the steam-pipe $o$.

$c$ represents a roll (not shown in Fig. 2) having an elastic surface rigidly secured thereto and journaled in movable boxes, which are adjustable by the screws $k$, whereby the degree of pressure against the embossing-roll is regulated.

$e$ represents a shaft provided with a series of circular knives $f$, journaled in movable boxes and adjustable vertically by means of the screws $m$.

$p$ represents a slot in the bed-plate, in which are adjustable the guides $h\ h$.

$i\ i$ represent guides which are adjustable in a slot in the bed-plate, as shown by the dotted lines $y\ y$. The forward end of the guides $i\ i$ are adapted to fit the curvature of the embossing-roll, as shown in Fig. 2. One end of the embossing-roll $a$ is provided with a pulley or other suitable means for imparting motion to it, and the other end is provided with a gear, which meshes with gears on the ends of the rolls $b$ and $c$, whereby each of said rolls have the same surface speed, and the rolls $c$ and $b$ have each a motion opposite to that of the roll $a$.

The machine is adapted to emboss paper, leather, plastic material, and to emboss plastic material on strips of wood for picture-frames and decorative purposes. To emboss paper or leather, the thin disks of metal between the embossing-section are removed, and the proper number and kind of embossing-rings are arranged on the roll to make up the required design. The guides $h\ h$ and $i\ i$ are removed from the bed-plate, and a carrying belt or apron $r'$ is laced around the rolls $b$ and $r$. The elastic-surfaced roll $c$ is then adjusted against the embossing-roll to the proper degree of pressure and steam admitted to the interior of the embossing-roll. The material is then passed between them onto the apron and is carried along under the circular knives, which divide it into strips of any desired width, according as the knives are adjusted on the shaft $e$. If it is not desired to divide the embossed material into strips, the shaft $e$, carrying knives $f$, is raised up by means of the screws $m$. To mold a number of strips of different design from plastic material, the thin disks of metal $d$ are interposed between the embossing-rings, as shown in Fig. 1. The elastic-surfaced roll $c$ is removed and a roll with a rigid surface substituted therefor and adjusted so as to nearly or quite touch the periphery of the metal disks. The steam is cut off from the embossing-roll, which is allowed to cool. The plastic material is then passed between the rolls onto the carrying-apron $r'$, from whence it is removed. To emboss plastic material on strips of wood the roll $c$ and the carrying-apron are removed and the guides $i\,i$ and $h\,h$ adjusted on the bed-plate, so that the strip of wood will just pass between them, and two of the circular knives on the shaft $e$ are adjusted in line with said guides, as in Fig. 1. The bed-plate and roll is then adjusted so as to admit the thickness of the strip of wood and the required thickness of plastic material between it and the embossing-roll. The plastic material is then placed on the strip of wood in the form of a rope and the end of the strip inserted between the guides $i\,i$, which serve to guide the strip of wood and prevent the plastic material from spreading unduly to the sides as the strip of wood and plastic material receive the pressure of the embossing-roll. As the strip passes along between the guides $h\,h$ and knives $f$ the edges of the plastic material are trimmed by the latter to conform to the width of the strip of wood.

Having thus described my improvements, what I claim, and desire to secure by Letters Patent, is—

1. In an embossing-machine, the combination of a hollow embossing-roll adapted to be connected with a steam-pipe, whereby it may be heated, an adjustable pressure-roll, and mechanism whereby said rolls are driven at a uniform surface speed in opposite directions, substantially as described.

2. In an embossing-machine, the combination, with an embossing-roll, of a bed-plate and bed-roll adapted to be adjusted to and from the embossing-roll, an adjustable pressure-roll, and mechanism whereby the embossing and pressure rolls are driven at a uniform surface speed in opposite directions, substantially as described.

3. In an embossing-machine, the combination, with an embossing-roll, of a bed-plate and bed-roll adjustable to and from the embossing-roll, an adjustable pressure-roll, mechanism for driving said embossing and pressure rolls at a uniform surface speed, a vertically-adjustable shaft carrying knives, and a carrying-apron, substantially as described.

4. In an embossing-machine, the combination of an embossing-roll having removable pattern-rings, a bed-plate, a bed-roll, and a shaft provided with rotary knives, substantially as described.

5. In an embossing-machine, the combination of an embossing-roll having a series of removable pattern-rings and intermediate disks, a vertically-adjustable bed-roll, and a vertically-adjustable transverse shaft having a series of rotary knives longitudinally adjustable thereon, substantially as described.

HUGH McHUGH.

Witnesses:
THOS. M. JAMES,
HENRY W. MASON.